US010220697B2

(12) United States Patent
Dousy et al.

(10) Patent No.: US 10,220,697 B2
(45) Date of Patent: Mar. 5, 2019

(54) POWERBOOST HUB

(71) Applicant: DANA ITALIA SPA, Arco (IT)

(72) Inventors: Carl Joris Dousy, Roeselare (BE); Nick Jeroen Josef Muylle, Ghent (BE); Ettore Cosoli, Padua (IT); Giulio Ornella, Arco (IT); Lorenzo Serrao, Nago-Torbole (IT)

(73) Assignee: Dana Italia SPA, Arco (IT)

( * ) Notice: Subject to any disclaimer, the term of this patent is extended or adjusted under 35 U.S.C. 154(b) by 62 days.

(21) Appl. No.: 15/330,079

(22) PCT Filed: Feb. 3, 2015

(86) PCT No.: PCT/EP2015/052213
§ 371 (c)(1),
(2) Date: Aug. 3, 2016

(87) PCT Pub. No.: WO2015/117963
PCT Pub. Date: Aug. 13, 2015

(65) Prior Publication Data
US 2016/0375752 A1 Dec. 29, 2016

Related U.S. Application Data

(60) Provisional application No. 61/935,617, filed on Feb. 4, 2014.

(51) Int. Cl.
*F16H 61/4096* (2010.01)
*B60K 6/12* (2006.01)
*F15B 1/04* (2006.01)

(52) U.S. Cl.
CPC .............. *B60K 6/12* (2013.01); *F15B 1/04* (2013.01); *F16H 61/4096* (2013.01);
(Continued)

(58) Field of Classification Search
CPC ............. F16H 61/4096; F16H 61/4043; F16H 61/4069
See application file for complete search history.

(56) References Cited

U.S. PATENT DOCUMENTS 4,760,697 A    8/1988  Heggie et al.
4,815,334 A    3/1989  Lexen
(Continued)

FOREIGN PATENT DOCUMENTS

CN        1394273       1/2003
CN      201176978 Y     1/2009
(Continued)

OTHER PUBLICATIONS

Machine-generated English Translation of DE19931208, obtained via Espacenet Patent Search.
(Continued)

*Primary Examiner* — F Daniel Lopez
(74) *Attorney, Agent, or Firm* — Marshall & Melhorn, LLC

(57) ABSTRACT

A series hydraulic hybrid system for a vehicle is described. The hydraulic hybrid system has a hydraulic circuit and a high pressure accumulator. The hydraulic circuit has a first hydraulic displacement unit in fluid communication with a second hydraulic displacement unit. The high pressure hydraulic accumulator is in fluid communication with the hydraulic circuit and a low pressure hydraulic accumulator in fluid communication with the hydraulic circuit. The high pressure hydraulic accumulator is in fluid communication with the hydraulic circuit through a proportional flow control valve. The proportional flow control valve is adapted to continuously vary a flow of hydraulic fluid between the high pressure hydraulic accumulator and the hydraulic circuit.

14 Claims, 7 Drawing Sheets

(52) U.S. Cl.
CPC ..... *B60K 2006/126* (2013.01); *B60Y 2400/14* (2013.01); *F15B 2211/405* (2013.01); *Y02T 10/6208* (2013.01); *Y02T 10/6282* (2013.01)

(56) References Cited

U.S. PATENT DOCUMENTS

| | | | |
|---|---|---|---|
| 5,518,461 A | 5/1996 | Pfordt | |
| 5,579,640 A | 12/1996 | Gray, Jr. et al. | |
| 5,887,674 A | 3/1999 | Gray, Jr. | |
| 6,622,484 B2 * | 9/2003 | Hopkins | F16H 61/4043 60/468 |
| 6,719,080 B1 | 4/2004 | Gray, Jr. | |
| 7,669,414 B2 | 3/2010 | Loeffler | |
| 7,870,727 B2 | 1/2011 | Mueller et al. | |
| 7,926,265 B2 | 4/2011 | Mueller et al. | |
| 7,934,779 B2 | 5/2011 | Kodama | |
| 7,984,783 B2 | 7/2011 | Gray, Jr. et al. | |
| 8,108,111 B2 | 1/2012 | Stein et al. | |
| 8,162,094 B2 | 4/2012 | Gray, Jr. et al. | |
| 8,616,323 B1 | 12/2013 | Gurin | |
| 8,959,905 B2 | 2/2015 | Baltes et al. | |
| 8,991,167 B2 | 3/2015 | Yuan et al. | |
| 9,032,723 B2 | 5/2015 | Haugen | |
| 9,057,389 B2 | 6/2015 | Opdenbosch | |
| 9,096,115 B2 | 8/2015 | Ho | |
| 9,765,502 B2 | 9/2017 | Heybroek | |
| 9,802,469 B2 | 10/2017 | Ornella | |
| 2004/0251067 A1 | 12/2004 | Gray, Jr. et al. | |
| 2006/0243515 A1 | 11/2006 | Okada et al. | |
| 2009/0165451 A1 | 7/2009 | Mueller | |
| 2011/0232418 A1 | 9/2011 | Gray, Jr. et al. | |
| 2011/0314801 A1 | 12/2011 | Baltes et al. | |
| 2012/0090308 A1 | 4/2012 | Yuan et al. | |
| 2012/0178570 A1 | 7/2012 | Gray, Jr. et al. | |
| 2012/0233991 A1 | 9/2012 | Ivantysynova et al. | |
| 2012/0240564 A1 | 9/2012 | Wesolowski et al. | |
| 2013/0081385 A1 | 4/2013 | Opdenbosch | |
| 2013/0133318 A1 | 5/2013 | Vogl et al. | |
| 2015/0113969 A1 | 4/2015 | Kochhan et al. | |
| 2016/0059694 A1 | 3/2016 | Heren | |
| 2016/0341309 A1 | 11/2016 | Serrao | |
| 2016/0361986 A1 | 12/2016 | Ornella | |
| 2017/0015197 A1 | 1/2017 | Lambey | |
| 2017/0067489 A1 | 3/2017 | Versteyhe | |
| 2017/0072778 A1 | 3/2017 | Ornella | |
| 2017/0305267 A1 | 10/2017 | Ornella | |
| 2017/0335867 A1 | 11/2017 | Meehan | |

FOREIGN PATENT DOCUMENTS

| | | | |
|---|---|---|---|
| CN | 102518169 A | 6/2012 | |
| CN | 102734237 A | 10/2012 | |
| DE | 19931208 A1 | 1/2001 | |
| DE | 102006060014 B4 | 6/2007 | |
| DE | 102006017581 A1 | 9/2007 | |
| DE | 102009056153 A1 | 6/2011 | |
| DE | 102011005356 A1 | 9/2012 | |
| DE | 102011055178 A1 | 5/2013 | |
| EP | 0615077 A1 | 9/1994 | |
| EP | 1963686 B1 | 10/2011 | |
| FR | 2971741 A1 | 8/2012 | |
| WO | 9634213 A1 | 10/1996 | |
| WO | 9713650 A1 | 4/1997 | |
| WO | 0151870 A1 | 7/2001 | |
| WO | 2007035997 A1 | 4/2007 | |
| WO | 2008012558 A2 | 1/2008 | |
| WO | 2010072299 A1 | 7/2010 | |
| WO | 2011112663 A2 | 9/2011 | |
| WO | 2012125798 A1 | 9/2012 | |
| WO | 2013121126 A1 | 8/2013 | |
| WO | 2013159851 A1 | 10/2013 | |

OTHER PUBLICATIONS

Machine-generated English Translation of CN201176978, obtained via Espacenet Patent Search.
Machine-generated English Translation of CN102518169, obtained via Espacenet Patent Search.
Machine-generated English Translation of CN102734237, obtained via Espacenet Patent Search.
Chinese Office Action issued by the Chinese State Intellectual Property Office dated Sep. 20, 2017.
European Patent Office, The International Search Report and Written Opinion of PCT/EP2015/052213, dated May 6, 2015, 9 pages, European Patent Office, Rijswijk, Netherlands.
The State Intellectual Property Office of the People's Republic of China; Office Action issued in the parallel Chinese application No. CN201580006877.4; dated Apr. 21, 2017; 15 pages; The State Intellectual Property Office of the People's Republic of China, Beijing, Republic of China.

* cited by examiner

POWERBOOST HUB

The present invention generally relates to hydraulic transmission systems, in particular for automotive vehicles. More specifically, the present invention primarily relates to series hydraulic hybrid systems including a hydraulic circuit, hydraulic accumulators and a powerboost hub for selectively fluidly connecting the hydraulic accumulators to the hydraulic circuit.

The present document claims priority from U.S. Provisional Patent Application No. 61/935,617 filed on Feb. 4, 2014, which is hereby incorporated by reference in its entirety.

BACKGROUND OF THE INVENTION

A hydrostatic transmission (HT) is a known technology that transfers power from a power source (typically an engine) to a power utilizer (typically a portion of a vehicle). The major components of the HT are a traction pump, one or more traction motors and a hydraulic circuit. The hydraulic circuit enables fluid communication between the pump and the motor(s).

It is also known that if one or more hydraulic accumulators are added to the vehicle and fluidly connected to the hydraulic circuit, the vehicle gains the capability of storing and re-injecting hydraulic energy, and may be commonly described as a series hybrid system (SHS).

A transition of the vehicle from using the HT to becoming an SHS is enabled by a powerboost hub, which is able to fluidly connect the hydraulic accumulator(s) to the hydraulic circuit and to disconnect the hydraulic accumulator(s) from the hydraulic circuit.

Due to the differences in hydraulic pressure that may exist between the hydraulic accumulators on one hand and the hydraulic circuit on the other, fluidly connecting the hydraulic accumulators to the hydraulic circuit may cause mechanical jerks. Disconnecting the hydraulic accumulators from the hydraulic circuit may have similar effects due to the resulting change in hydraulic power fed to the hydraulic circuit. However, these mechanical jerks are generally undesirable since their occurrence may impair the controllability of the transmission and cause increased wear of mechanical components.

SUMMARY OF THE INVENTION

Therefore, it is an object of the present invention to provide a series hydraulic hybrid system that enables a smooth connection and/or disconnection of the hydraulic accumulators to/from the hydraulic circuit.

This object is solved by a series hydraulic hybrid system comprising the features of claim 1. Special embodiments of the proposed system are described in the independent claims.

The presently proposed series hydraulic hybrid system, in particular for use in an automotive vehicle, comprises at least:
- a hydraulic circuit comprising a first hydraulic displacement unit in fluid communication with a second hydraulic displacement unit; and
- a high pressure hydraulic accumulator in fluid communication with the hydraulic circuit and a low pressure hydraulic accumulator in fluid communication with the hydraulic circuit;
- wherein the high pressure hydraulic accumulator is in fluid communication with the hydraulic circuit through a proportional flow control valve, the proportional flow control valve being adapted to continuously vary a flow of hydraulic fluid between the high pressure hydraulic accumulator and the hydraulic circuit.

Within the scope of this document the formulation "in fluid communication with" may include one of "fluidly connected to" and "selectively fluidly connected to", for example through one or more valves.

Typically, the first hydraulic displacement unit is a hydraulic pump drivingly engaged or selectively drivingly engaged with an engine of the vehicle. The engine may be an internal combustion engine (ICE), for example. The first hydraulic displacement unit may have a variable hydraulic displacement. For example, the first hydraulic displacement unit may be a hydrostatic axial piston pump having a movable swashplate. The second hydraulic displacement unit may be a hydraulic motor, for example a hydrostatic axial piston motor. The second hydraulic displacement unit may be drivingly engaged or selectively drivingly engaged with a vehicle output. The vehicle output may include at least one of a driveshaft, a final drive, a vehicle axle and one or more wheels, for example.

The accumulators may be configured as compressed gas accumulators. An accumulator may be pressurized by filling or by partially filling the corresponding accumulator with a hydraulic fluid such as oil, thereby compressing a quantity of gas contained in the accumulator. The gas may be an inert gas such as nitrogen. Similarly, an accumulator may be de-pressurized by letting a compressed gas contained in the accumulator expand, thereby pushing hydraulic fluid contained in the accumulator out of the accumulator and creating a fluid flow. The accumulators may be adapted to operate at hydrostatic pressures up to a maximum operating pressure of at least 200 bar or of at least 300 bar, for example.

The series hydraulic hybrid system may be adapted to be selectively operated in a hydrostatic mode and in one or more hybrid modes. In the hydrostatic mode, the accumulators are fluidly disconnected from the hydraulic circuit. The engine may then drive the first hydraulic displacement unit to displace or circulate hydraulic fluid in the hydraulic circuit, thereby driving the second hydraulic displacement unit so that mechanical energy may be transmitted from the engine to the second hydraulic displacement unit through the hydraulic circuit.

In the hybrid mode, the accumulators are fluidly connected to the hydraulic circuit. In one hybrid mode, the accumulators may be charged by driving the first hydraulic displacement unit to displace hydraulic fluid from the low pressure accumulator to the high pressure accumulator, thereby increasing a pressure gradient between the high pressure accumulator and the low pressure accumulator (energy accumulation).

In another hybrid mode, the second hydraulic displacement unit may absorb kinetic energy from the vehicle output to displace hydraulic fluid from the low pressure accumulator to the high pressure accumulator (regenerative braking).

In another hybrid mode, hydraulic fluid may be displaced from the high pressure accumulator to the low pressure accumulator through the second hydraulic displacement unit for driving a vehicle output drivingly engaged with the second hydraulic displacement unit.

The proposed series hydraulic hybrid system may be arranged in an off-highway vehicle, for example. Off-highway vehicles may include but are not limited to tractors, harvesters, crawlers, mining vehicles or material handling vehicles such as wheel loaders, wheeled excavators, backhoe loaders, telehandlers, dumpers, or the like.

The fact that the high pressure accumulator is in fluid communication with the hydraulic circuit through the proportional flow control valve allows the high pressure accumulator to be connected to the hydraulic circuit and to be disconnected from the hydraulic circuit in a smooth, predefined and controllable manner. For example, when fluidly connecting the high pressure accumulator to the hydraulic circuit the proportional flow control valve may be actuated to gradually increase a flow of fluid through the proportional flow control valve. Similarly, when fluidly disconnecting the high pressure accumulator from the hydraulic circuit the proportional flow control valve may be actuated to gradually decrease a flow of fluid through the proportional flow control valve.

In this manner, the proportional flow control valve may reduce a mechanical jerk produced during the connection/disconnection procedure. This may advantageously increase the controllability of the system and may furthermore reduce wear of the mechanical components of the system.

A cross section (area) of the proportional flow control valve through which hydraulic fluid may flow through the proportional flow control valve may be continuously variable between a first value and a second value, the second value being larger than the first value. The first value may be zero, that is the proportional flow control valve may be adapted to be completely closed. In particular, the proportional flow control valve may be adapted to be controlled or actuated such that the cross section may be fixed at any desired value between the first and the second value. Proportional flow control valves of this sort are generally known in the art. The continuously variable control position of the proportional flow control valve may be controllable through hydraulic forces or through electromagnetic forces, for example. The proportional flow control valve may be controllable through an electric signal and/or through a hydraulic pilot pressure applied to the proportional flow control valve.

The hydraulic circuit typically comprises a first main fluid line and a second main fluid line, the first hydraulic displacement unit and the second hydraulic displacement unit being in fluid communication with each other through the first main fluid line and the second main fluid line. For example, the first main fluid line may fluidly connect or selectively fluidly connect a first fluid port of the first hydraulic displacement unit to a first fluid port of the second hydraulic displacement unit. Similarly, the second main fluid line may fluidly connect or selectively fluidly connect a second fluid port of the first hydraulic displacement unit to a second fluid port of the second hydraulic displacement unit. That is, the hydraulic circuit may be configured as a closed hydraulic circuit formed or selectively formed by the first and the second hydraulic displacement unit and by the first and the second main fluid line. Usually, the hydraulic circuit is fluidly sealed from the external environment. For example, a minimum hydraulic pressure within the hydraulic circuit may be at least 10 bar or at least 20 bar.

The high pressure accumulator may be selectively fluidly connected to the first main fluid line through a first shut-off valve and may be selectively fluidly connected to the second main fluid line through a second shut-off valve. For example, the proportional flow control valve and the first shut-off valve may be arranged in series such that hydraulic fluid flowing from the high pressure accumulator to the first main fluid line or vice versa passes through the proportional flow control valve and through the first shut-off valve. Similarly, the proportional control valve and the second shut-off valve may be arranged in series such that hydraulic fluid flowing from the high pressure accumulator to the second main fluid line or vice versa passes through the proportional flow control valve and through the second shut-off valve.

More specifically, the high pressure accumulator may be selectively fluidly connected to the first shut-off valve and to the second shut-off valve through the proportional flow control valve. That is, the proportional flow control valve may be fluidly arranged between the high pressure accumulator and the first shut-off valve such that hydraulic fluid flowing from the high pressure accumulator to the hydraulic circuit first passes through the proportional flow control valve and only subsequently passes through the first shut-off valve. Analogously, the proportional flow control valve may be fluidly arranged between the high pressure accumulator and the second shut-off valve such that hydraulic fluid flowing from the high pressure accumulator to the hydraulic circuit first passes through the proportional flow control valve and only subsequently passes through the second shut-off valve.

Optionally, a by-pass valve may be arranged in parallel to the proportional flow control valve for shorting or for selectively shorting the proportional flow control valve. For example, the by-pass valve may include a check valve adapted to allow a flow of fluid from the hydraulic circuit to the high pressure accumulator through the check valve, and to block a flow of fluid from the high pressure accumulator to the hydraulic circuit through the check valve.

The low pressure accumulator, too, may be selectively fluidly connected to the first main fluid line through a third shut-off valve and may be selectively fluidly connected to the second main fluid line through a fourth shut-off valve.

The shut-off valves are typically adapted to be selectively switched to an open position in which hydraulic fluid may flow through the shut-off valve and to a closed position in which the shut-off valve blocks a flow of hydraulic fluid through the shut-off valve. For example, the shut-off valves may be configured as 2/2-way valves. When closed, the first and the second shut-off valve serve or additionally serve to fluidly disconnect the high pressure accumulator from the hydraulic circuit. Similarly, when closed, the third and the fourth shut-off valve serve or additionally serve to fluidly disconnect the low pressure accumulator from the hydraulic circuit.

When the first and the second shut-off valve are in the closed position, thereby fluidly disconnecting the high pressure accumulator from the hydraulic circuit, a smooth fluid connection between the high pressure accumulator and the first main fluid line may be established by initially actuating the proportional flow control valve to allow only a small flow of hydraulic fluid or no flow of hydraulic fluid to pass through the proportional flow control valve while keeping the first shut-off valve shut. The first shut-off valve may then be opened and, subsequently, the proportional flow control valve may be actuated to gradually increase the flow of hydraulic fluid through the proportional flow control valve. A smooth connection between the high pressure accumulator and the second main fluid line may be established in an analogous manner using the proportional flow control valve and the second shut-off valve.

Similarly, when both the first shut-off valve and the proportional flow control valve are open, thereby allowing a flow of hydraulic fluid between the high pressure accumulator and the first main fluid line through the proportional flow control valve and through the first shut-off valve, a smooth disconnection of the high pressure accumulator from the first main fluid line may be realized by actuating the proportional flow control valve to gradually decrease the flow of hydraulic fluid through the proportional flow control valve while keeping the first shut-off valve open. When the flow of hydraulic fluid between the high pressure accumulator and the first main fluid line has been reduced to a desired small value or to zero, the first shut-off valve may be switched to the closed position to fluidly disconnect or to additionally fluidly disconnect the high pressure accumulator from the first main fluid line. A smooth disconnection of the high pressure accumulator from the second main fluid line may be established in an analogous manner using the proportional flow control valve and the second shut-off valve.

The shut-off valves may be configured as cartridge valves with theoretically zero leakage. Cartridge valves are an economical solution compared to other valves combining high flow and high pressure. The cartridge valves typically include a cover and a cartridge element such as a seated poppet having a conical shape. The cartridge element may be equipped with a damping nose. The cartridge element may be loaded with a closing spring forcing the cartridge element in the closed position. The cartridge valves may be adapted to be actuated by a hydraulic pilot pressure. For example, the valve cover may be provided with one or more pilot bores through which the pilot pressure may be applied to the cartridge element.

The system may further comprise check valves adapted to apply to each of the shut-off valves a pilot pressure for actuating the shut-off valve. The check valves may be fluidly connected such that the pilot pressure applied to a given shut-off valve is at least equal to the greatest hydraulic pressure acting on or through the fluid ports of that shut-off valve. The hydraulic pressure acting on the fluid ports of the shut-off valve typically forces the shut-off valve into the open position. In this way it is ensured that the pilot pressure acting on the shut-off valve for forcing the shut-off valve into the closed position is at least equal to or greater than the greatest hydraulic pressure acting on the shut-off valve through the fluid ports of the shut-off valve. When the shut-off valves are configured as cartridge valves, an area of the cartridge element through which the pilot pressure may be applied to the cartridge element for forcing the cartridge element into the closed position is preferably at least equal to or larger than the area of the cartridge element through which a hydraulic opening force may act on the cartridge element through the fluid ports of the cartridge valve.

The hydraulic pilot pressure may be applied to the shut-off valves through a pilot fluid line. The pilot fluid line may be selectively fluidly connected to each of the shut-off valves through corresponding pilot valves such that the shut-off valves may be piloted independently. The pilot line may be in fluid communication with the high pressure accumulator through a first check valve. The pilot line may be in fluid communication with the low pressure accumulator through a second check valve. The pilot line may be in fluid communication with the first main fluid line through a third check valve. The pilot line may be in fluid communication with the second main fluid line through a fourth check valve. In this way the hydraulic pilot pressure in the pilot line may be at least equal to the maximum system pressure.

Specifically, the first check valve may be adapted to allow a flow of fluid from the high pressure accumulator to the pilot fluid line through the first check valve and to block a flow of fluid from the pilot fluid line to the high pressure accumulator through the first check valve. The second check valve may be adapted to allow a flow of fluid from the low pressure accumulator to the pilot fluid line through the second check valve and to block a flow of fluid from the pilot fluid line to the low pressure accumulator through the second check valve. The third check valve may be adapted to allow a flow of fluid from the first main fluid line to the pilot fluid line through the third check valve and to block a flow of fluid from the pilot fluid line to the first main fluid line through the third check valve. And the fourth check valve may be adapted to allow a flow of fluid from the second main fluid line to the pilot fluid line through the fourth check valve and to block a flow of fluid from the pilot fluid line to the second main fluid line through the fourth check valve.

The proportional flow control valve may likewise be adapted to be actuated by a hydraulic pilot pressure. The hydraulic pilot pressure applied to the proportional flow control valve may be provided through the pilot fluid line described above. For example, the pilot fluid line may be fluidly connected or selectively fluidly connected to the proportional flow control valve through a pressure-reducing valve.

As an alternative to providing the pilot pressure to the shut-off valves through the above described pilot fluid line, each shut-off valve may be associated with a corresponding first check valve and with a corresponding second check valve, the first check-valve providing fluid communication between the first fluid port of the shut-off valve and the pilot bore of the shut-off valve, and the second check-valve providing fluid communication between the second fluid port of the shut-off valve and the pilot bore of the shut-off valve. The first check valve is then adapted to allow a flow of fluid from the first fluid port of the shut-off valve to the pilot bore of the shut-off valve and to block a flow of fluid from the pilot bore of the shut-off valve to the first fluid port of the shut-off valve, while the second check valve is adapted to allow a flow of fluid from the second fluid port of the shut-off valve to the pilot bore of the shut-off valve and to block a flow of fluid from the pilot bore of the shut-off valve to the second fluid port of the shut-off valve. In this manner, the highest hydraulic pressure acting on the fluid ports of a given shut-off valve is used as a pilot pressure for that shut-off valve. This ensures that the shut-off valves may be securely closed at all times. Preferably, the pilot pressure may be selectively applied to the pilot bore. To that end, additional (secondary shut-off) valves may be provided with each of the two check valves associated with a given shut-off valve.

The system may further comprise isolation valves for selectively fluidly disconnecting the first hydraulic displacement unit from the second hydraulic displacement unit and/or from the accumulators, in particular when the accumulators are fluidly connected to the hydraulic circuit. These isolation valves, too, may be configured as cartridge valves of the above mentioned type. Isolating the first hydraulic displacement unit from the accumulators and from the second hydraulic displacement unit may be useful when charging the accumulators through the second hydraulic displacement unit, for example during regenerative braking, or when driving the second hydraulic displacement unit using hydraulic energy stored in the accumulators. In these cases, isolating the first hydraulic displacement unit may prevent unwanted energy absorption by the first hydraulic displacement unit, for example.

In order to avoid cavitation in the first hydraulic displacement unit when isolating the first hydraulic displacement unit from the accumulators and/or from the second hydraulic displacement unit, a by-pass valve may be provided for selectively directly fluidly connecting a first fluid port of the first hydraulic displacement unit to a second fluid port of the first hydraulic displacement unit.

In order to prevent a hydraulic pressure in the high pressure accumulator from exceeding a first threshold pressure, a first pressure relief valve may be placed in fluid communication with the high pressure accumulator. Similarly, in order to prevent a hydraulic pressure in the low pressure accumulator from exceeding a second threshold pressure, a second pressure relief valve may be placed in fluid communication with the low pressure accumulator.

Furthermore, a first electric relief valve may be placed in fluid communication with the high pressure accumulator and/or a second electric relief valve may be placed in fluid communication with the low pressure accumulator for selectively draining the high pressure accumulator and/or the low pressure accumulator, for example when the vehicle is shut down.

BRIEF DESCRIPTION OF THE DRAWINGS

Preferred embodiments of the presently proposed system are described in the following detailed description and are depicted in the accompanying drawing in which.

DETAILED DESCRIPTION OF THE INVENTION

Figure 1:
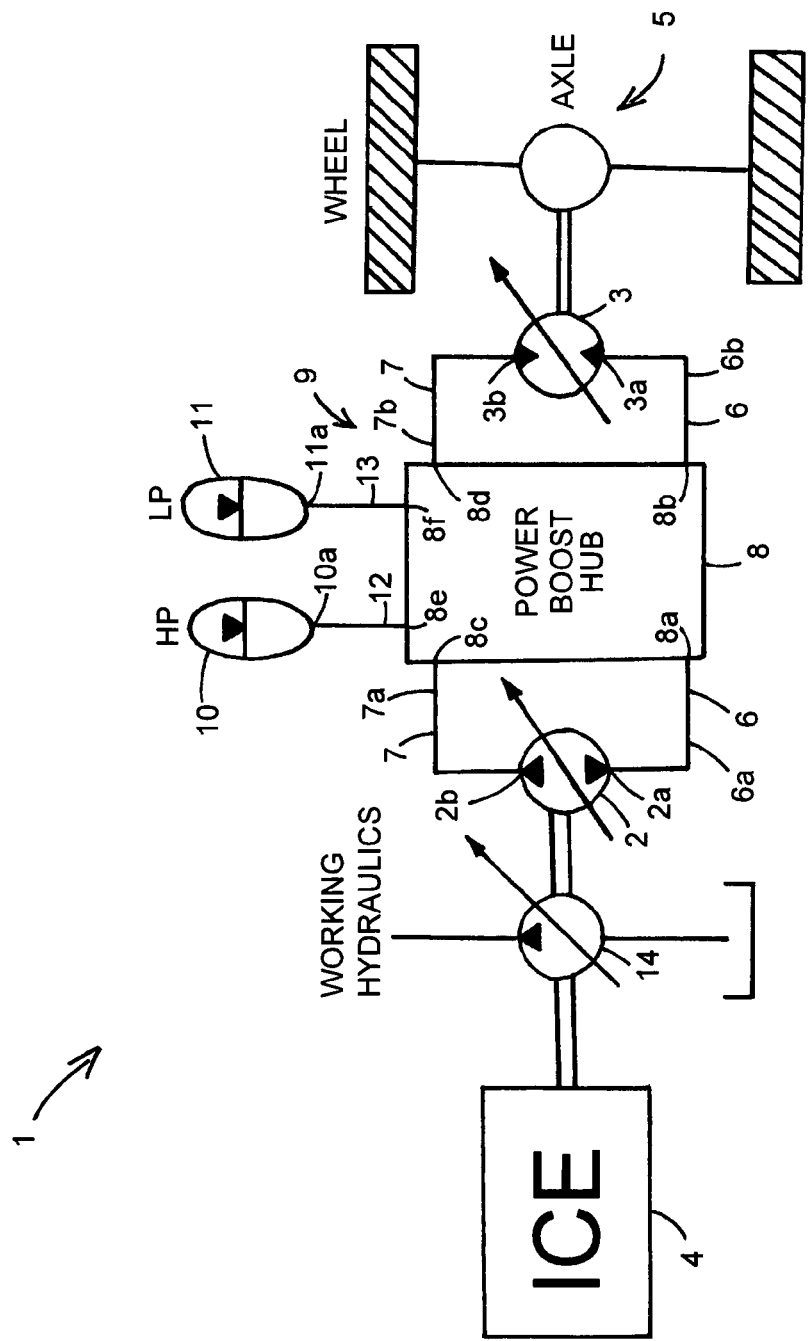
FIG. 1 shows a series hydraulic hybrid system including a hydraulic circuit comprised of a hydrostatic pump in fluid communication with a hydrostatic motor, and hydraulic accumulators selectively fluidly connected to the hydraulic circuit through a powerboost hub.

FIG. 1 shows a series hydraulic hybrid system 1 arranged in an off-highway vehicle. The system 1 includes a hydraulic pump 2 which is in fluid communication with a hydraulic motor 3. The pump 2 is drivingly engaged with an internal combustion engine (ICE) 4. The motor 3, on the other hand, is drivingly engaged with a vehicle output 5. The vehicle output 5 may include at least one of a drive shaft, a final drive, a vehicle axle, and one or more wheels, for example. The pump 2 may be a hydrostatic axial piston pump having a movable swashplate, and the motor 3 may be a hydrostatic axial piston motor in bent-axis design or having a movable swashplate, for example.

The pump 2 and the motor 3 are in fluid communication with each other through a first main fluid line 6, a second main fluid line 7, and through a powerboost hub 8. The hub 8 is a mechatronic unit comprising a plurality of fluid lines, valves and electric actuators. The hub 8 is configured to selectively fluidly connect the pump 2 and the motor 3 through the main fluid lines 6 and 7 to form a closed hydrostatic circuit 9.

Specifically, the pump 2 has a first fluid port 2a and a second fluid port 2b. The motor 3 has a first fluid port 3a and a second fluid port 3b. The hub 8 has fluid ports 8a, 8b, 8c, and 8d. A section 6a of the first main fluid line 6 fluidly connects the fluid port 2a of the pump 2 to the fluid port 8a of the hub 8. A section 6b of the first main fluid line 6 fluidly connects the fluid port 8b of the hub 8 to the fluid port 3a of the motor 3. A section 7a of the second main fluid line 7 fluidly connects the fluid port 2b of the pump 2 to the fluid port 8c of the hub 8. A section 7b of the second main fluid line 7 fluidly connects the fluid port 8d of the hub 8 to the fluid port 3b of the motor 3.

The system 1 further includes a high pressure bladder accumulator 10 and a low pressure bladder accumulator 11. A fluid port 10a of the high pressure accumulator 10 is fluidly connected to a fluid port 8e of the hub 8 through a fluid pipe 12. A fluid port 11a of the low pressure accumulator 11 is fluidly connected to a fluid port 8f of the hub 8 through a fluid pipe 13. The accumulators 10 and 11 are in fluid communication with the hydrostatic circuit 9 through the hub 8. In other words, the hub 8 is configured to selectively fluidly disconnect the accumulators 10, 11 from the hydrostatic circuit 9 and to selectively fluidly connect the accumulators 10, 11 to the hydrostatic circuit 9. Specifically, the hub 8 is configured to selectively fluidly connect the high pressure accumulator 10 to the first main fluid line 6 or to the second main fluid line 7. Also, the hub 8 is configured to selectively fluidly connect the low pressure accumulator 11 to the first main fluid line 6 or to the second main fluid line 7.

The system 1 may be operated in a hydrostatic mode. In the hydrostatic mode, the hub 8 fluidly disconnects the accumulators 10, 11 from the hydrostatic circuit 9. Further, in the hydrostatic mode the hub 8 fluidly connects the fluid port 2a of the pump 2 to the fluid port 3a of the motor 3 through the first main fluid line 6, and fluidly connects the fluid port 2b of the pump 2 to the fluid port 3b of the motor 3 through the second main fluid line 7. In the hydrostatic mode, mechanical energy may be transmitted from the ICE 4 to the vehicle output 5 through the hydrostatic circuit 9.

The system 1 may further be operated in one or more hybrid modes by fluidly connecting the accumulators 10, 11 to the hydrostatic circuit 9 through the hub 8.

In one hybrid mode, the hub 8 fluidly connects the high pressure accumulator 10 to the first main fluid line 6 and fluidly connects the low pressure accumulator 11 to the second main fluid line 7. The ICE 4 may then drive the pump 2 to displace hydraulic fluid from the low pressure accumulator 11 to the high pressure accumulator 10, thereby increasing a hydraulic pressure in the high pressure accumulator 10 and decreasing a hydraulic pressure in the low pressure accumulator 11 (energy accumulation).

In another hybrid mode, the hub 8 may fluidly connect the accumulators 10, 11 to the fluid ports 3a, 3b of the motor 3, respectively, such that the motor 3 may absorb kinetic energy from the vehicle output 5 and use the absorbed kinetic energy to displace hydraulic fluid from the low pressure accumulator 11 to the high pressure accumulator 10, thereby increasing a hydraulic pressure in the high pressure accumulator 10 and decreasing a hydraulic pressure in the low pressure accumulator 11 (regenerative braking). The hub 8 may be configured to fluidly connect the accumulators 10, 11 to the fluid ports 3a, 3b of the motor 3 to perform regenerative braking during both forward and rearward movement of the vehicle. The hub 8 may further be configured to fluidly disconnect the pump 2 from the motor 3 and from the accumulators 10, 11 during regenerative braking.

In another hybrid mode, the hub 8 may fluidly connect the accumulators 10, 11 to the fluid ports 3a, 3b of the motor 3 in such a way that hydraulic fluid is displaced from the high pressure accumulator 10 to the low pressure accumulator 11 through the motor 3 to drive the motor 3, thereby decreasing a hydraulic pressure in the high pressure accumulator 10 and increasing a hydraulic pressure in the low pressure accumulator 11 (boosting). In this manner, hydraulic energy stored in the accumulators 10, 11 may be transmitted to the vehicle output 5 to drive the vehicle. The hub 8 may be configured to fluidly connect the accumulators 10, 11 to the fluid ports 3a, 3b of the motor 3 such that the boosting operation may be performed during both forward and rearward movement of the vehicle.

In another hybrid mode, the hub 8 may fluidly connect the accumulators 10, 11 to the fluid ports 2a, 2b of the pump 2 such that hydraulic fluid may be displaced from the high pressure accumulator 10 to the low pressure accumulator 11 through the pump 2 to drive the pump 2 and to start the engine 4.

Figure 2:
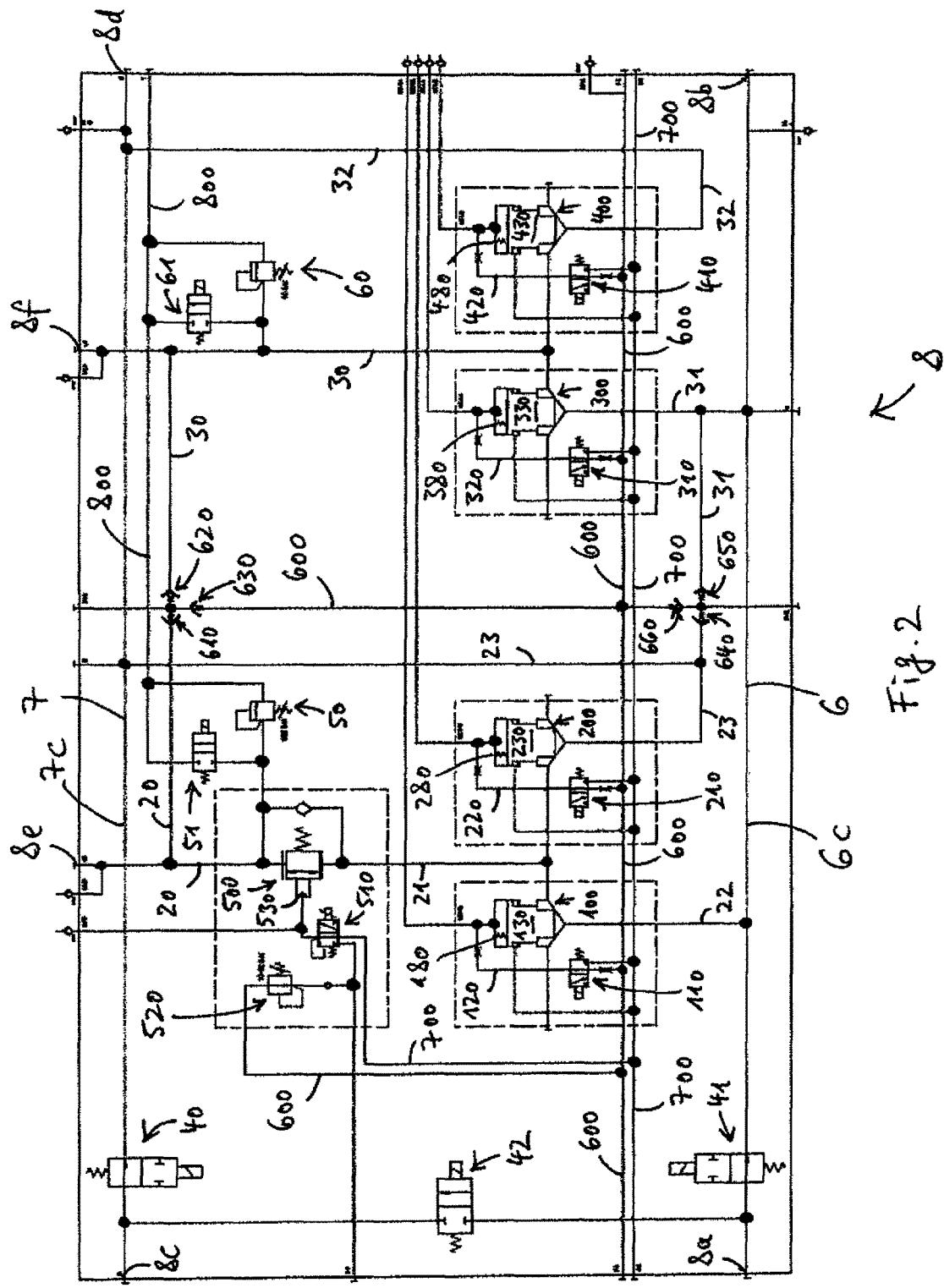
FIG. 2 shows a hydraulic circuit diagram of a first embodiment of the powerboost hub of FIG. 1.

FIG. 2 shows a hydraulic circuit diagram of the power-boost hub 8 shown in FIG. 1. Here and in the following, recurring features are designated by the same reference signs. In order to increase the readability of the circuit diagrams of FIG. 2 seq., crossing fluid lines that are fluidly connected to each other at a given crossing are explicitly marked with a dot at this crossing. Crossing fluid lines whose crossing is not marked with a dot are not fluidly connected to each other at this crossing.

The hub 8 in FIG. 2 comprises a section 6c of the first main fluid line 6. The section 6c provides fluid communication between the fluid ports 8a and 8b of the hub 8. Furthermore, the hub 8 comprises a section 7c of the second main fluid line 7. The section 7c provides fluid communication between the fluid ports 8c and 8d of the hub 8. As shown in FIG. 1, the fluid ports 8a, 8c of the hub 8 are fluidly connected to the pump 2, and the fluid ports 8b, 8d of the hub 8 are fluidly connected to the motor 3. Further, as shown in FIG. 1, the fluid port 8e of the hub 8 in FIG. 2 is fluidly connected to the high pressure accumulator 10, and the fluid port 8f of the hub 8 in FIG. 2 is fluidly connected to the low pressure accumulator 11. FIG. 2 shows a plurality of further fluid ports of the hub which are not designated by reference signs. These are mere measuring ports who are of no particular relevance to the functionality of the hub 8.

The high pressure accumulator 10 is in fluid communication with the section 6c of the first main fluid line 6 through the fluid port 8e of the hub 8, a fluid line 20, a proportional flow control valve 500, a fluid line 21, a first shut-off valve 100, and a fluid line 22. The high pressure accumulator 10 may be fluidly connected to the first main fluid line 6 by opening the proportional flow control valve 500 and by opening the first shut-off valve 100. The high pressure accumulator 10 may be fluidly disconnected from the first main fluid line 6 by closing the first shut-off valve 100. The proportional flow control valve 500 may additionally be closed to fluidly disconnect the high pressure accumulator 10 from the first main fluid line 6.

The high pressure accumulator 10 is in fluid communication with the section 7c of the second main fluid line 7 through the fluid port 8e of the hub 8, the fluid line 20, the proportional flow control valve 500, the fluid line 21, a second shut-off valve 200, and a fluid line 23. The high pressure accumulator 10 may be fluidly connected to the second main fluid line 7 by opening the proportional flow control valve 500 and by opening the second shut-off valve 200. The high pressure accumulator 10 may be fluidly disconnected from the second main fluid line 7 by closing the second shut-off valve 200. The proportional flow control valve 500 may additionally be closed to fluidly disconnect the high pressure accumulator 10 from the second main fluid line 7.

The low pressure accumulator 11 is in fluid communication with the section 6c of the first main fluid line 6 through the fluid port 8f of the hub 8, a fluid line 30, a third shut-off valve 300, and a fluid line 31. The low pressure accumulator 11 may be fluidly connected to the first main fluid line 6 by opening the third shut-off valve 300. The low pressure accumulator 11 may be fluidly disconnected from the first main fluid line 6 by closing the third shut-off valve 300.

The low pressure accumulator 11 is in fluid communication with the section 7c of the second main fluid line 7 through the fluid port 8f of the hub 8, the fluid line 30, a fourth shut-off valve 400 and a fluid line 32. The low pressure accumulator 11 may be fluidly connected to the second main fluid line 7 by opening the fourth shut-off valve 400. The low pressure accumulator 11 may be fluidly disconnected from the second main fluid line 7 by closing the fourth shut-off valve 400.

The high pressure accumulator 10 is selectively fluidly connected to the shut-off valves 100, 200 through the proportional flow control valve 500. That is, the proportional flow control valve 500 is positioned between the high pressure accumulator 10 and the first shut-off valve 100. The proportional flow control valve 500 and the first shut-off valve 100 are arranged in series between the high pressure accumulator 10 and the first main fluid line 6. That is, hydraulic fluid flowing from the high pressure accumulator 10 to the first main fluid line 6 through the proportional flow control valve 500 and the first shut-off valve 100 first passes through the proportional flow control valve 500 and only subsequently passes through the first shut-off valve 100. Similarly, the proportional flow control valve 500 is positioned between the high pressure accumulator 10 and the second shut-off valve 200. The proportional flow control valve 500 and the second shut-off valve 200 are arranged in series between the high pressure accumulator 10 and the second main fluid line 7. That is, hydraulic fluid flowing from the high pressure accumulator 10 to the second main fluid line 7 through the proportional flow control valve 500 and through the second shut-off valve 200 first passes through the proportional flow control valve 500 and only subsequently passes through the second shut-off valve 200.

The proportional flow control valve 500 may be actuated to continuously vary a flow of fluid through the proportional flow control valve 500. For example, the proportional flow control valve 500 may have a continuously variable cross-section through which hydraulic fluid may pass through the valve 500. The cross-section of the valve 500 may be varied by varying the position of a valve piston or valve spool 530. The position of the piston or spool 530 of the valve 500 may be controlled by applying a hydraulic pilot pressure to the piston or spool 530, as will be explained in further detail below with reference to FIG. 5, which shows a detailed view of the proportional flow control valve 500.

The shut-off valves 100, 200, 300, 400 are configured as identical cartridge valves with theoretically zero leakage. The shut-off valves 100, 200, 300, 400 each comprise a seated conically shaped cartridge respectively designated by 130, 230, 330, 430 and a closing spring respectively designated by 180, 280, 380, 480 forcing the cartridge into the closed position (see FIG. 4).

Figure 4:
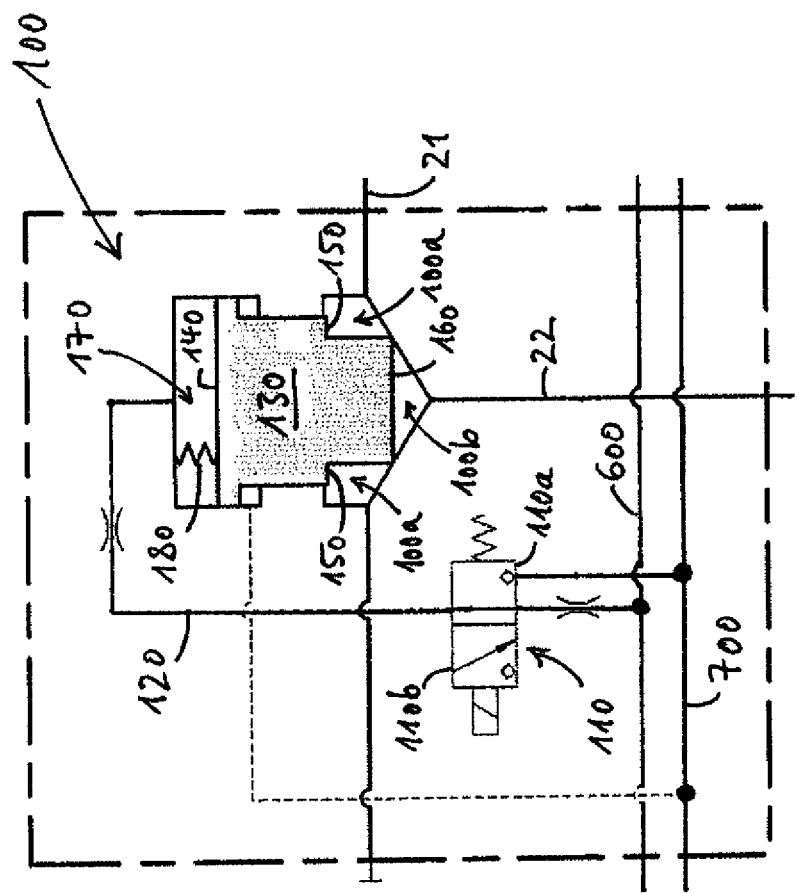
FIG. 4 shows a detail of the circuit diagram of FIG. 2 including a cartridge selectively fluidly connecting a high pressure hydraulic accumulator to the hydraulic circuit.

As an example of the identical shut-off valves 100, 200, 300, 400, the first shut-off valve 100 is shown in detail in FIG. 4. The valve 100 has a ring-shaped first fluid port 100a and a second fluid port 100b. The cartridge valve 100 is adapted to be piloted by applying a hydraulic pilot pressure to a top surface 140 of the cartridge 130. The top surface 140 is larger than the sum of further surfaces 150 and 160 on a bottom side of the cartridge 130. Through the first fluid port 100a and through the second fluid port 100b an opening force may be applied onto the surfaces 150 and 160 to force the cartridge 130 into the open position. In the closed position, the cartridge 130 blocks a flow of fluid between the fluid ports 100a and 100b. In the open position, the cartridge 130 allows a flow of fluid between the fluid ports 100a and 100b.

The hydraulic pilot pressure for piloting the first shut-off valve 100 is provided by a pilot fluid line 600 (see FIGS. 2 and 4). The pilot fluid line 600 is selectively fluidly connected to an actuation chamber 170 of the shut-off valve 100 through a 3/2-way pilot valve 110 and a fluid line 120. The pilot valve 110 has two spool positions 110a and 110b. When switched to the first spool position 110a, the pilot valve 110 fluidly connects the pilot fluid line 600 to the actuation chamber 170 so that the pilot pressure in the pilot fluid line 600 is applied to the top surface 140 of the cartridge 130 through the actuation chamber 170.

As will be explained in more detail below, the pilot pressure in the pilot fluid line 600 is regulated such that the cartridge 130 is forced into the closed position when the pilot valve 110 is switched to the first spool position 110a. When switched to the second spool position 110b, the pilot valve 110 fluidly connects the actuation chamber 170 of the shut-off valve 100 to a low pressure drain line 700. The drain line 700 may be fluidly connected to a fluid tank at atmospheric pressure, for example.

When the pilot valve 110 is actuated to be switched to the second spool position 110b, the hydraulic pressure acting on the cartridge 130 through the fluid ports 100a, 100b may force the cartridge 130 into the open position.

The cartridges 230, 330, 430 of the shut-off valves 200, 300, 400 are piloted in the same manner as the cartridge 130 of the first shut-off valve 100. That is, the shut-off valves 200, 300, 400 are associated with corresponding 3/2-way pilot valves 210, 310, 410, which selectively fluidly connect actuation chambers 270, 370, 470 of the shut-off valves 200, 300, 400 to the pilot fluid line 600 or to the low pressure drain line 700. The pilot valves 110, 210, 310, 410 for piloting the shut-off valves 100, 200, 300, 400 may be independently electrically controlled. In other words, the shut-off valves 100, 200, 300, 400 may be controlled independently.

The hub 8 further comprises check valves 610, 620, 630, 640, 650, 660 (see FIG. 2) which provide fluid communication between the accumulators 10, 11 and the main fluid lines 6, 7 on the one hand and the pilot fluid line 600 on the other hand in such a way that the pilot pressure in the pilot fluid line 600 is at least equal to the highest system pressure. The highest system pressure is the highest hydraulic pressure of the hydraulic pressures in the accumulators 10, 11 and in the main fluid lines 6, 7. This ensures that the pilot pressure in the pilot fluid line 600 is at all times large enough to securely close the shut-off valves 100, 200, 300, 400, if desired. The check valves 630, 660 are merely optional in the arrangement shown in FIG. 2.

Specifically, the pilot fluid line 600 is in fluid communication with the high pressure accumulator 10 through the fluid port 8e of the hub 8, the fluid line 20, and the check valves 610 and 630. The check valves 610, 630 allow a flow of fluid from the high pressure accumulator 10 to the pilot fluid line 600 and block a flow of fluid from the pilot fluid line 600 to the high pressure accumulator 10.

The pilot fluid line 600 is in fluid communication with the low pressure accumulator 11 through the fluid port 8f of the hub 8, the fluid line 30, and the check valves 620 and 630. The check valves 620, 630 allow a flow of fluid from the low pressure accumulator 11 to the pilot fluid line 600 and block a flow of fluid from the pilot fluid line to the low pressure accumulator 11.

The pilot fluid line 600 is in fluid communication with the first main fluid line 6 through the fluid line 31 and the check valves 650 and 660. The check valves 650, 660 allow a flow of fluid from the first main fluid line 6 to the pilot fluid line 600 and block a flow of fluid from the pilot fluid line 600 to the first main fluid line 6.

The pilot fluid line 600 is in fluid communication with the second main fluid line 7 through the fluid line 23 and the check valves 640 and 660. The check valves 640, 660 allow a flow of fluid from the second main fluid line 7 to the pilot fluid line 600 and block a flow of fluid from the pilot fluid line 600 to the second main fluid line 7.

In an alternative embodiment not explicitly depicted here the pilot pressure for piloting the shut-off valves 100, 200, 300, 400 is not provided by the pilot fluid line 600. Rather, in this alternative embodiment each of the shut-off valves 100, 200, 300, 400 is equipped with at least two check valves. Each of these two check valves provides fluid communication between one of the fluid ports of the shut-off valve and the actuation chamber of the shut-off valve. For example, with regard to the first shut-off valve 100 shown in FIG. 4, the first of the two check valves associated with the shut-off valve 100 according to this alternative embodiment provides fluid communication between the first fluid port 100a and the actuation chamber 170, and the second of the two check valves associated with the shut-off valve 100 according to this alternative embodiment provides fluid communication between the second fluid port 100b and the actuation chamber 170. The first check valve is then adapted to allow a flow of fluid from the first fluid port 100a to the actuation chamber 170 and to block a flow of fluid from the actuation chamber 170 to the first fluid port 100a. Similarly, the second check valve is then adapted to allow a flow of fluid from the second fluid port 100b to the actuation chamber 170 and to block a flow of fluid from the actuation chamber 170 to the second fluid port 100b. According to this alternative embodiment, each of the further shut-off valves 200, 300, 400 may be equipped with corresponding first and second check valves in the same manner. The two check valves associated with a given shut-off valve according to the above described alternative embodiment ensure that the highest hydraulic pressure acting on the shut-off valve through the fluid ports of that shut-off valve is used for piloting that shut-off valve, thereby guaranteeing a leak-free closure. In this alternative embodiment, the pilot bore of the shut-off valve is preferably associated with an additional on-off pilot valve that allows selective application of the pilot pressure to the actuation chamber.

Back to the embodiment shown in FIG. 2, the pilot fluid line 600 further provides a pilot pressure for piloting the proportional flow control valve 500. This pilot pressure may be selectively applied to the spool 530 of the proportional flow control valve 500 through an actuation chamber (not shown) of the proportional flow control valve 500. This Actuation chamber of the proportional flow control valve 500 may be selectively fluidly connected to the pilot fluid line 600 or to the drain line 700 through a proportional 3/2-way pilot valve 510.

Figure 5:
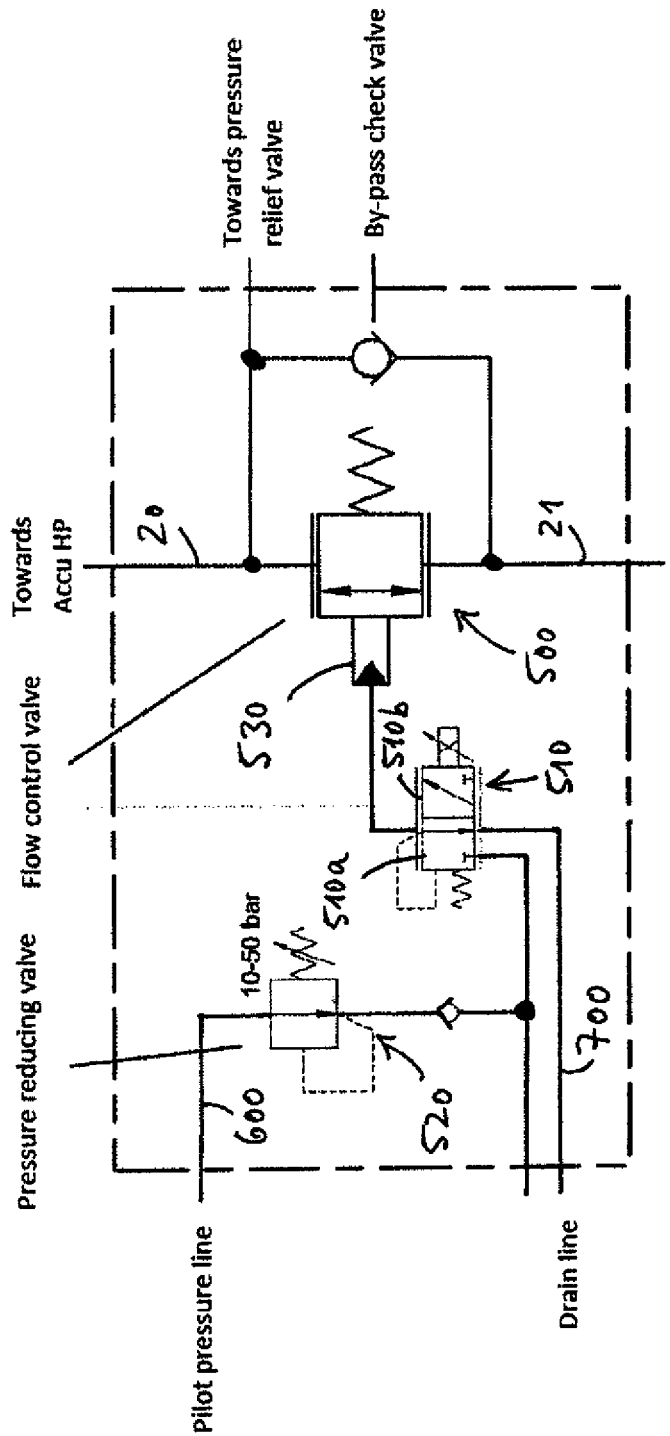
FIG. 5 shows a further detail of the circuit diagram of FIG. 2 including a proportional flow control selectively fluidly connecting the high pressure hydraulic accumulator to the cartridge valve of FIG. 4.

FIG. 5 shows a detailed view of the proportional flow control valve. When switched to a first spool position 510*a*, the pilot valve 510 fluidly connects the drain line 700 to the actuation chamber of the proportional flow control valve 500, wherein a flow of fluid through the pilot valve 510 may be continuously varied. When switched to a second spool position 510*b*, the pilot valve 510 provides fluid communication between the actuation chamber of the proportional flow control valve 500 and the pilot fluid line 600, wherein a flow of fluid through the pilot valve 510 may be continuously varied. When the pilot valve 510 is switched to the second spool position 510*b*, the actuation chamber of the proportional flow control valve 500 is in fluid communication with the pilot fluid line 600 through a pressure-reducing valve 520. The pressure-reducing valve 520 reduces the pilot pressure in the pilot fluid line 600 to a suitable pilot pressure for piloting the spool 530 of the proportional flow control valve 500.

Figure 6:
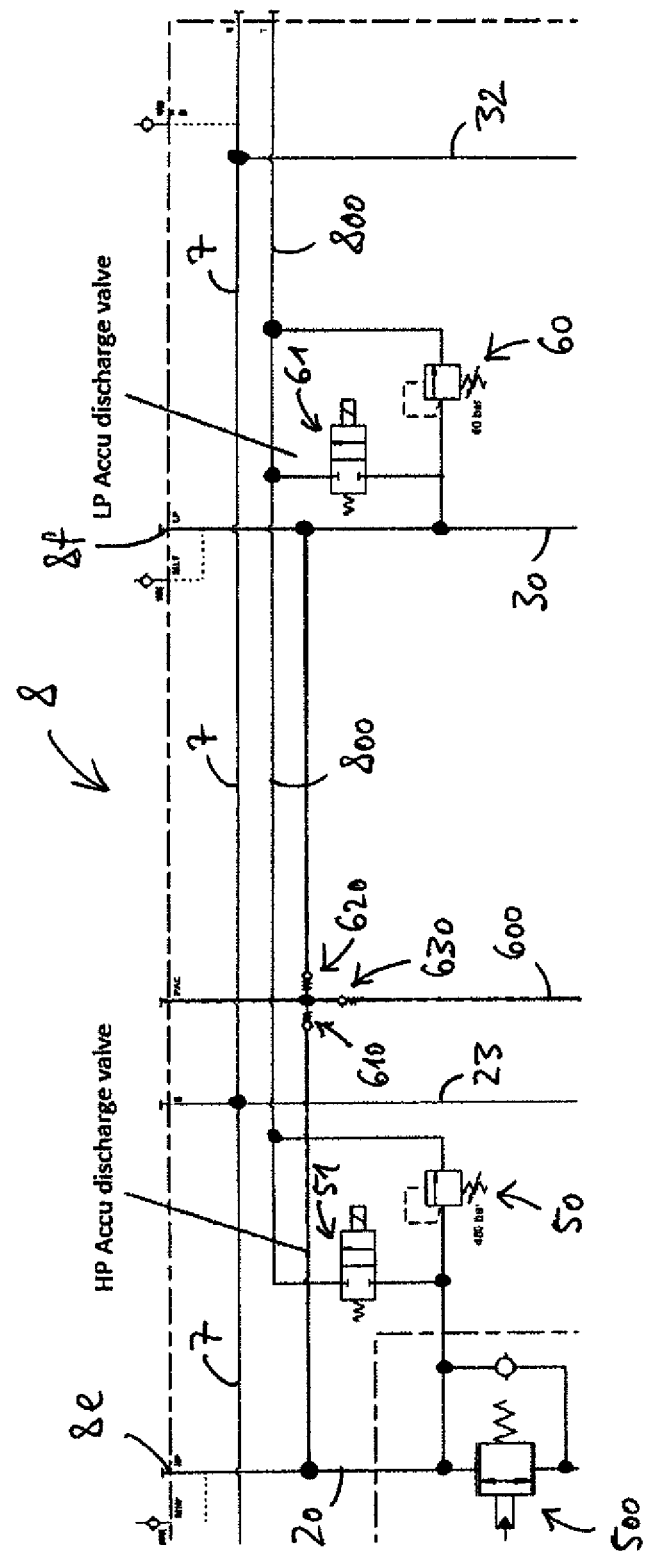
FIG. 6 shows a further detail of the circuit diagram of FIG. 2 including pressure relief valves and electronic relief valves.

As shown in FIGS. 2 and 6, the hub 8 further comprises a first pressure relief valve 50 and a first electric relief valve 51 providing fluid communication between the fluid port 8*e* of the hub 8 and a relief line 800 which is fluidly connected to a fluid tank at atmospheric pressure (not shown). The pressure relief valve 50 prevents a hydraulic pressure in the high pressure accumulator 10 from exceeding a first threshold pressure above which the high pressure accumulator 10 may be damaged. The electric relief valve 51 may be used to selectively drain hydraulic fluid from the high pressure accumulator 10 to the fluid tank, for example when the vehicle is shut down.

The hub 8 further comprises a second pressure relief valve 60 and a second electric relief valve 61 providing fluid communication between the fluid port 8*f* and the relief line 800. Like the corresponding valves 50, 51 the valves 60, 61 are configured to limit a hydraulic pressure in the low pressure accumulator 11 to a second threshold pressure and to selectively drain hydraulic fluid from the low pressure accumulator 11 to the fluid tank, respectively.

Figure 7:
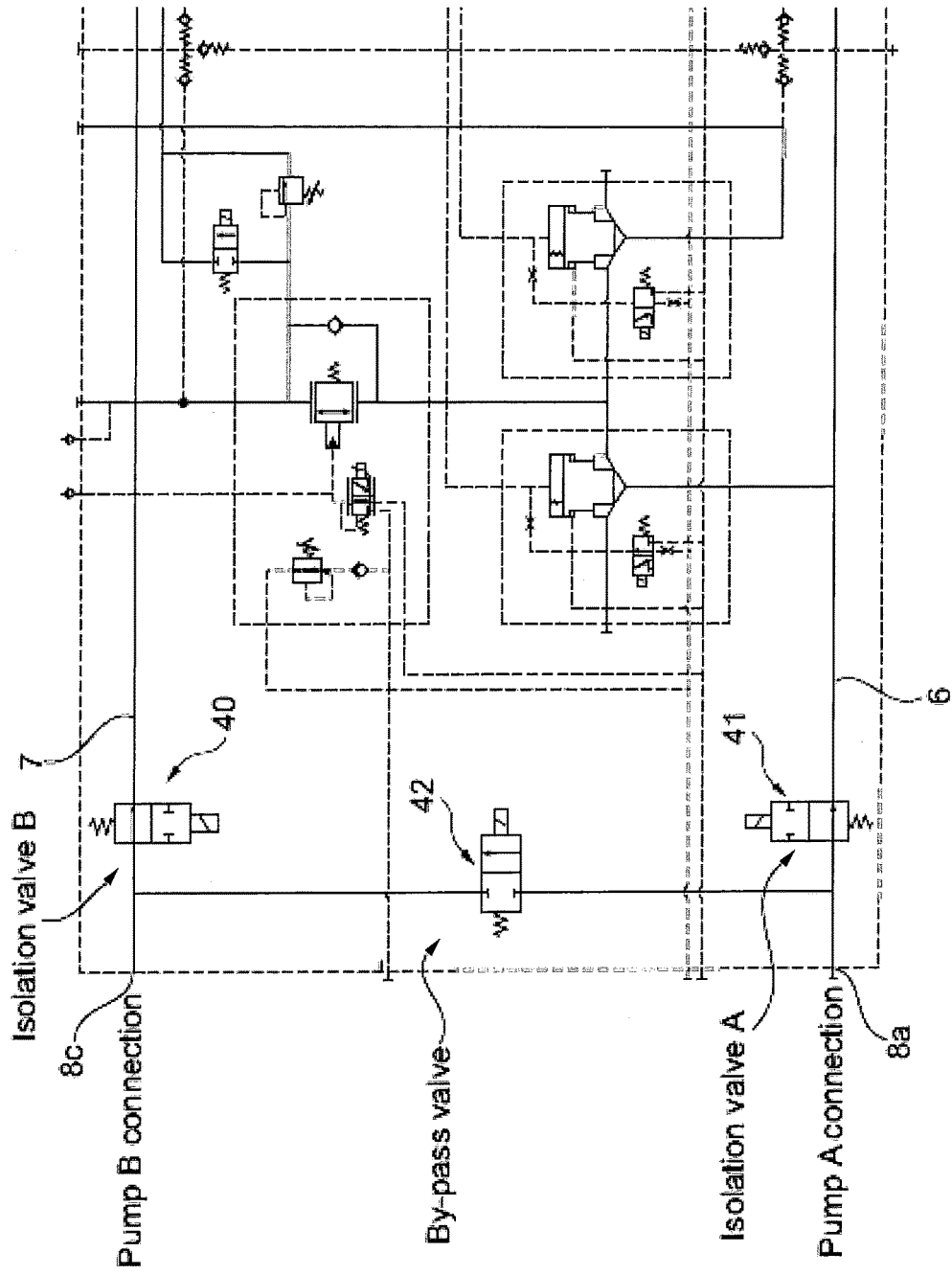
FIG. 7 shows a further detail of the circuit diagram of FIG. 2 including isolation valves for selectively fluidly isolating the hydrostatic pump from the hydraulic accumulators and from the hydrostatic motor.

As shown in FIGS. 2 and 7, the hub 8 further comprises 2/2-way isolation valves 40, 41 and a 2/2-way bypass valve 42. The valves 40, 41, 42 may be configured as cartridge valves with theoretically zero leakage, just like the shut-off valves 100, 200, 300, 400. The isolation valves 40, 41 are configured to selectively fluidly disconnect or isolate the pump 2 from the motor 3 and from the accumulators 10, 11. This may be useful during regenerative braking, for example. When isolating the pump 2 in this manner by closing the isolation valves 40, 41, the bypass valve 42 may be opened, thereby directly fluidly connecting the fluid ports 2*a*, 2*b* of the pump 2 to each other (see FIG. 1). This may be useful to avoid cavitation in the pump 2 when isolating the pump 2 from the motor 3 and from the accumulators 10, 11.

The powerboost hub 8 shown in FIGS. 1-7 is configured as a single block or manifold which the various components of the hub 8 shown in FIGS. 2-7 are integrated in.

Figure 3:
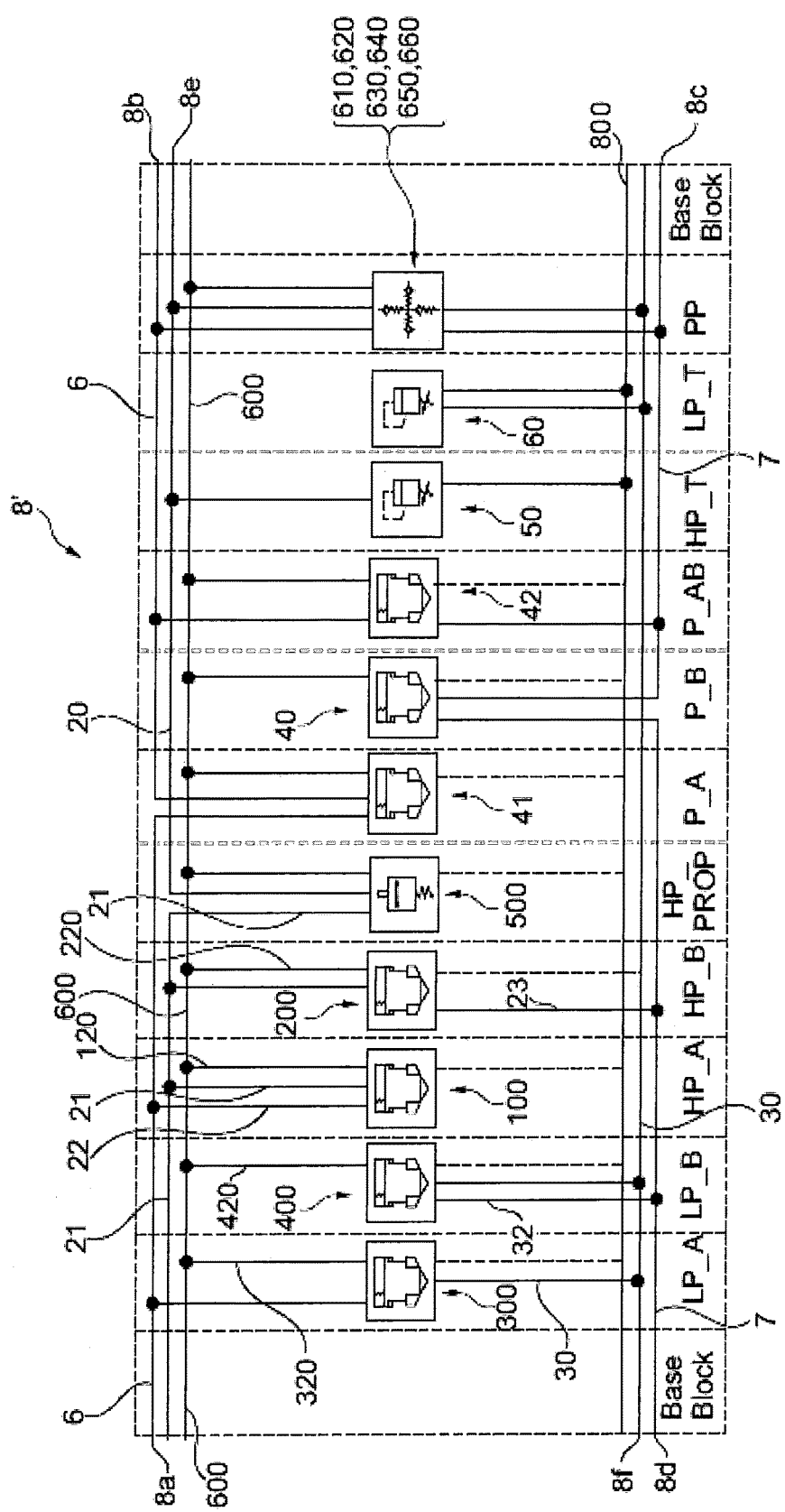
FIG. 3 shows a hydraulic circuit diagram of a second embodiment of the powerboost hub of FIG. 1.

An alternative embodiment of the hub 8 of FIG. 2 and FIGS. 4-7 is the powerboost hub 8' shown in FIG. 3. The various components of the hub 8' are integrated in a modular design, where each component is integrated in one modular block. The custom made modular blocks of the hub 8' are then bolted together to form the hub 8'. The functionality of the components of the hub 8' and their mutual fluid connection is identical to that of the corresponding components shown in FIG. 2 and FIGS. 4-7. The modular hub 8' is compact, enables series production of components and introduces extra flexibility. The flexibility enables the possibility to easily add or remove functions and allows easy maintenance or replacement of a single component.

The design for the powerboost hub 8, 8' is capable of being operated in two operating modes (using the HT and operation as the SHS described above) and in a transition mode from one mode to the other. Particularly, the powerboost hub 8, 8' is able to perform the following:

In the HT mode, the accumulators need to be disconnected from the hydraulic circuit.

In the SHS mode, the accumulators need to be connected to the hydraulic circuit.

During the transition mode from HT to SHS mode and vice versa, the transition needs to happen in a predefined, controllable manner.

Components of the powerboost hub 8, 8' must also be able to meet the following criteria:

Economical, for example, able to be produced in a cost effective manner.

Able to resist high pressures and also allowing high flow rates, for example, such properties are important for sizing and actuation purposes.

Able to be effectively controlled, for example, components that have a fast response time.

Capable of high efficiency operation, for example, leak free and low pressure drop operation.

Such requirements raise several issues, which are addressed by the powerboost hub 8, 8'. The issues are listed here below:

No availability of commercial off-the-shelf components which resist high pressure (450 bar) and permit high flow (400 l/min).

Connect or disconnect particular accumulators (accumulator 10 or accumulator 11) to particular side of Hystat.

Control of transient phase/prevent shock effect, during connection and disconnection of high pressure accumulators to/from the hydrostatic circuit.

Prevent excessive pressure in the accumulators.

While connected to the Hystat, accumulator 10 can leak via pump, even with pump on zero displacement.

A solution for connection and disconnection of accumulators to the hydraulic circuit is given by the powerboost hub 8, 8'. The powerboost hub 8, 8' is a mechatronic unit that comprises a plurality of hydraulic valves and electronic actuation devices. The powerboost hub 8, 8' can be positioned in two different manners:

The normal representation is positioning the powerboost hub between a hydrostatic pump, one or more hydrostatic motors, and a pair of accumulators (see FIG. 1).

Alternatively it can be represented as being positioned between the hydraulic circuit and the pair of accumulators. This solution is not followed in this invention as it disables the use of particular functions.

The possible solutions S1.1 through S5.2 below are related to the issues listed above and are described in further detail here below:

S1.1 Customized manifold containing all the components.

S1.2 Customized modular blocks bolted together.

S2.1 Shut-off valves for each system location: accumulator 10—line 6, accumulator 10—line 7, accumulator 11—line 6, accumulator 11—line 7.

S2.2 Cartridge valves with theoretical zero leakage are used as shut-off valves.

S2.3 A minimum of 4 check valves put the highest system pressure on the pilot line. This pilot pressure feeds all cartridge valves in the Hub.

S3.1 A proportional valve in between accumulator 10 and the accumulator 10 shut-off valves.

S3.2 A proportional valve in between accumulator 10 and the accumulator 10 shut-off valves with additionally a by-pass valve for one direction usage.

S3.3 A minimum of 4 check valves put the highest system pressure on the pilot line. Pilot pressure for the proportional valve is provided by reducing the highest system pressure on the pilot line.

S3.4 Accurate control of displacement of hydro motors.

S4.1 Pressure relief valves integrated at the accumulator connection ports.

S4.2 Electric relief valves integrated at the accumulator connection ports.

S5.1 Isolation valves between Hub and Hystat Pump, integrated in Hub. Isolation valves are implemented as previously mentioned cartridge valves.

S5.2 Isolation valves between Hub and Hystat Pump, integrated in Hub. Additional by-pass valve integrated in Hub in between isolation valves allow immediate use of isolation valves without pump cavitation. Isolation valves and by-pass valve are implemented as previously mentioned cartridge valves.

S1.1—Customized components are required that combine a high maximum working pressure with a high maximum flow rate. Ail the separate components can be integrated in a single manifold, which serves as the second powerboost hub (see FIG. 2). The manifold is a compact design compared to single components connected by hydraulic pipes or hoses.

S1.2—Custom components are required that combine a high maximum working pressure with a high maximum flow rate. The components can be integrated in a modular design, where each component is integrated in one modular block. These custom made modular blocks bolted together in a single Hub (see FIG. 3). The modular Hub is compact, enables series production of components and introduces extra flexibility. The flexibility enables the possibility to easily add or remove functions and allows easy maintenance or replacement of a single component.

S2—Shut-off valves can be used to provide the connection between the different systems. The accumulators can be connected to either the hydrostatic line 6 or 7. Accordingly, each accumulator uses two shut-off valves. A total of four equal cartridge valves may be used:

shut-off valve 100 for connection Accu 10 to Hydrostat 6,
shut-off valve 200 for connection Accu 10 to Hydrostat 7,
shut-off valve 300 for connection Accu 11 to Hydrostat 6,
shut-off valve 400 for connection Accu 11 to Hydrostat 7.

S2.2—Alternatively to the previous solution, cartridge valves can be used as shut-off valves, enabling the following benefits:

Cartridge valves are an economical solution compared to other valves combining high flow and high pressure.
Cartridge valves are actuated by pilot pressure, an economical actuation for strong forces.
Cartridge valves prevent leakage from accumulators or from Hydrostat. In closed state, leakage between Hydrostat and accumulators is prevented by the conical shape of the cartridge nose.

All four cartridge valves can be identical (see FIG. 4). The cartridge valves comprise a cover and a cartridge element. The cover is provided with pilot bores. The cartridge comprises a housing, a valve poppet (optionally with a damping nose) and a closing spring.

The medium can flow through the cartridge valve from the first fluid port to the second fluid port or vice versa. When the top surface is pressurized due to the pilot oil from the external pilot oil supply, line 6 is leak-free closed. The pilot pressure should be the highest pressure between the two fluid ports of the cartridge valve.

The cartridge valves are normally closed due to the design of the pilot valve. When the pilot valve is not actuated, pilot pressure is acting on the top surface. However when the valve is energized, the top surface is relieved from pressure due to the tank connection that is established.

S2.3—Cartridge valves are closed if the force acting on the top surface is equal to or greater than the sum of the forces acting on the nose and side surfaces. To ensure the force on the top surface is always of this magnitude, the pressure on this surface must always by equal to or higher than the highest pressure on either the nose or the side of the cartridge. Shuttle valves can be used to check highest pressure between nose and side of each cartridge, but this requires the use of many components.

The pilot pressure for cartridges can be derived using four check valves. Each check valve connects to a specific location in the system (Hydrostat 6, Hydrostat 7, Accu 10 and Accu 11). These locations correspond to the pressures acting on the cartridge valves. The check valves will connect the pilot pressure line to the system location with the highest pressure. The pilot pressure line can thus foresee all cartridge valves with the current highest system pressure.

S3.1—A proportional flow control valve can be used for smooth transition (see FIG. 5). The flow control valve is located between the high pressure accumulator and the two shut-off valves connecting it to the hydrostat circuit. To control the flow control valve, pilot pressure is required to overcome the high actuation forces. A pilot pressure is controlled by the proportional pilot valve.

S3.2—A proportional valve causes pressure drop and should be by-passed as much as possible. Additionally to the previously described solution, a check valve can be used to by-pass the flow control valve when the medium flows towards Accu 10.

S3.3—A minimum of four check valves can be used to put the highest system pressure on the pilot pressure line. Pilot pressure for the proportional valve can be provided by reducing the highest system pressure of the pilot line to a preferred value.

S3.4—A proportional valve is an expensive component. Another solution is to work without proportional valve and provide smooth transition of vehicle behavior by using displacement control in the hydromotors. In this case, the shut-off valves are connected directly to Accu 10. Note that a pressure shock is not prevented, it is merely unnoticed by the operator.

S4.1—Pressure relief valves can be integrated at the accumulator connection ports to prevent excessive pressure in the accumulators (see FIG. 6). The maximum pressure in Accu 10 and Accu 11 is determined by the setting of their respective pressure relief valves. If the pressure relief setting is reached, the superfluous flow and pressure are relieved to the tank. The pressure relief valves should be leak free to avoid leakage from the accumulators or the Hydrostat system to tank.

S4.2. Accumulator discharge is needed in order to set the machine on zero energy level when the vehicle is shut down. Electrically controlled relief valves allow discharge of the accumulators to tank (see FIG. 6). Without these valves, discharging can be done only via the hydrostatic circuit or via manual relief valves. The electric relief valves can be implemented in the form of cartridge shut-off valves, although in a different manner to the ones previously mentioned. The electric relief valves should be dimensioned in order to discharge the accumulators fast enough without causing damage to the accumulator bladder.

S5.1—Shut-off valves in the Hub can be used to isolate the Hydrostat pump from the rest of the circuit. This isolation can improve the performance of the system by avoiding accumulator leakage via the Hydrostat pump during accumulator connection. Two cartridge valves designed as previously mentioned can be used as isolation valves.

S5.2—To prevent cavitation in the Hydrostat circuit, the Hydrostat pump must be at zero displacement before isolation. Alternatively, a by-pass valve can be used to shortcut the Hydrostat pump ports. A cartridge valve designed as previously mentioned can be used as by-pass valve (see FIG. 7 below).

The invention claimed is:

1. A series hydraulic hybrid system for a vehicle, comprising:
   a hydraulic circuit comprising a first hydraulic displacement unit in fluid communication with a second hydraulic displacement unit through a first main fluid line and through a second main fluid line; and
   a high pressure hydraulic accumulator in fluid communication with the hydraulic circuit and a low pressure hydraulic accumulator in fluid communication with the hydraulic circuit;
   a first pressure-actuatable shut-off valve selectively fluidly connecting the high pressure hydraulic accumulator with the first main fluid line;
   a second pressure-actuatable shut-off valve selectively fluidly connecting the high pressure hydraulic accumulator with the second main fluid line;
   a pressure actuatable proportional flow control valve fluidly connecting the high pressure hydraulic accumulator with the hydraulic circuit; and
   a pilot fluid line for piloting the first pressure-actuatable shut-off valve, the second pressure-actuatable shut-off valve and the pressure actuatable proportional flow control valve via the pilot fluid line.

2. The series hydraulic hybrid system of claim 1, wherein the low pressure hydraulic accumulator is selectively fluidly connected with the first main fluid line through a third shut-off valve and with the second main fluid line through a fourth shut-off valve.

3. The series hydraulic hybrid system of claim 2, wherein the third shut-off valve and the fourth shut-off valve are cartridge valves adapted to be actuated by a hydraulic pi of pressure applied to the third shut-off valve and to the fourth shut-off valve via the pilot fluid line.

4. The series hydraulic hybrid system of claim 2, further comprising isolation valves for selectively fluidly disconnecting the first hydraulic displacement unit from the second hydraulic displacement unit and from the first, second, third, and fourth shut-off valves.

5. The series hydraulic hybrid system of claim 4, further comprising a by-pass valve adapted to selectively directly fluidly connect a first fluid port of the first hydraulic displacement unit to a second fluid port of the first hydraulic displacement unit.

6. The series hydraulic hybrid system of claim 1, wherein the high pressure hydraulic accumulator is selectively fluidly connected with the first shut-off valve and with the second shut-off valve through the proportional flow control valve.

7. The series hydraulic hybrid system of claim 1, wherein the first shut-off valve and the second shut-off valve are cartridge valves.

8. The series hydraulic hybrid system of claim 1, wherein the pilot fluid line is in fluid communication with the high pressure shut hydraulic accumulator through a first check valve, with the low pressure hydraulic accumulator through a second check valve, with the first main fluid line through a third check valve and with the second main fluid line through a fourth check valve, such that the hydraulic pilot pressure in the pilot fluid line is at least equal to the maximum system pressure.

9. The series hydraulic hybrid system of claim 8,
   wherein the first check valve is configured to allow a flow of fluid from the high pressure accumulator to the pilot fluid line through the first check valve and to block a flow of fluid from the pilot fluid line to the high pressure accumulator through the first check valve;
   wherein the second check valve may is configured to allow a flow of fluid from the low pressure accumulator to the pilot fluid line through the second check valve and to block a flow of fluid from the pilot fluid line to the low pressure accumulator through the second check valve;
   wherein the third check valve is configured adapted to allow a flow of fluid from the first main fluid line to the pilot fluid line through the third check valve and to block a flow of fluid from the pilot fluid line to the first main fluid line through the third check valve; and
   wherein the fourth check valve is configured to allow a flow of fluid from the second main fluid line to the pilot fluid line through the fourth check valve and to block a flow of fluid from the pilot fluid line to the second main fluid line through the fourth check valve.

10. The series hydraulic hybrid system of claim 1, wherein the proportional flow control valve is adapted to be actuated by a hydraulic pilot pressure provided to the proportional flow control valve through the pilot fluid line via a pressure-reducing valve.

11. The series hydraulic hybrid system of claim 1, further comprising a pressure relief valve in fluid communication with the high pressure hydraulic accumulator.

12. The series hydraulic hybrid system of claim 1, further comprising a pressure relief valve in fluid communication with the low pressure hydraulic accumulator.

13. The series hydraulic hybrid system of claim 1, further comprising an electric relief valve in fluid communication with the high pressure hydraulic accumulator for selectively draining the high pressure hydraulic accumulator when the vehicle is shut down.

14. The series hydraulic hybrid system of claim 1, further comprising an electric relief valve in fluid communication with the low pressure hydraulic accumulator for selectively draining the low pressure hydraulic accumulator when the vehicle is shut down.

* * * * *

UNITED STATES PATENT AND TRADEMARK OFFICE
CERTIFICATE OF CORRECTION

PATENT NO. : 10,220,697 B2
APPLICATION NO. : 15/330079
DATED : March 5, 2019
INVENTOR(S) : Carl Joris Dousy et al.

It is certified that error appears in the above-identified patent and that said Letters Patent is hereby corrected as shown below:

In the Claims

Claim 3, Column 17, Line 53, the words "pi" and "of" should be deleted and replaced with "pilot"

Signed and Sealed this
Twenty-third Day of April, 2019

Andrei Iancu
*Director of the United States Patent and Trademark Office*